(12) United States Patent
Ooya

(10) Patent No.: US 9,657,838 B2
(45) Date of Patent: May 23, 2017

(54) COMBINED OIL CONTROL RING

(71) Applicant: KABUSHIKI KAISHA RIKEN, Tokyo (JP)

(72) Inventor: Yoshihito Ooya, Kumagaya (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 14/404,586

(22) PCT Filed: May 27, 2013

(86) PCT No.: PCT/JP2013/064653
§ 371 (c)(1),
(2) Date: Nov. 28, 2014

(87) PCT Pub. No.: WO2013/180065
PCT Pub. Date: Dec. 5, 2013

(65) Prior Publication Data
US 2015/0145218 A1    May 28, 2015

(30) Foreign Application Priority Data

May 28, 2012    (JP) .................. 2012-120628

(51) Int. Cl.
*F16J 9/06* (2006.01)
*F16J 9/12* (2006.01)
*F16J 9/20* (2006.01)

(52) U.S. Cl.
CPC ............... *F16J 9/068* (2013.01); *F16J 9/066* (2013.01); *F16J 9/203* (2013.01); *F16J 9/06* (2013.01); *F16J 9/064* (2013.01); *F16J 9/12* (2013.01)

(58) Field of Classification Search
CPC ...... F15J 9/06; F15J 9/064; F15J 9/066; F15J 9/067; F15J 9/068; F15J 9/145; F15J 9/203
See application file for complete search history.

(56) References Cited

U.S. PATENT DOCUMENTS 2,277,926 A * 3/1942 Mayfield .................. F16J 9/068
                                                    277/480
2,664,328 A * 12/1953 Hamm ..................... F16J 9/068
                                                    277/480
(Continued)

FOREIGN PATENT DOCUMENTS

FR    1280297    12/1961
GB    273487     7/1927
(Continued)

OTHER PUBLICATIONS

International Search Report issued in PCT/JP2013/064653 dated Aug. 13, 2013.
(Continued)

*Primary Examiner* — Nicholas L Foster
(74) *Attorney, Agent, or Firm* — Birch, Stewart, Kolasch & Birch, LLP

(57) ABSTRACT

A combined oil control ring for automobile engines capable of keeping an excellent oil-controlling function without suffering sticking between a spacer expander and side rails for a long period of operation comprises upper and lower two side rails, and an axially corrugated spacer expander having upper and lower portions; a leg portion connecting each upper portion and each lower portion of the spacer expander having a portion having an inclination angle θ of 15° or more from the axial direction.

8 Claims, 3 Drawing Sheets

(56) References Cited

U.S. PATENT DOCUMENTS

| | | | | |
|---|---|---|---|---|
| 2,676,076 A * | 4/1954 | Hamm | ................... | F16J 9/066 |
| | | | | 277/478 |
| 2,761,749 A * | 9/1956 | Marien | ................... | F16J 9/067 |
| | | | | 277/480 |
| 2,904,377 A * | 9/1959 | Endres | ................... | F16J 9/068 |
| | | | | 267/1.5 |
| 2,967,746 A * | 1/1961 | Braendel | ................ | F16J 9/068 |
| | | | | 277/480 |
| 3,184,245 A * | 5/1965 | Woolcott | ................ | F16J 9/066 |
| | | | | 277/445 |
| 3,814,444 A * | 6/1974 | Johnson | ................. | F16J 9/068 |
| | | | | 277/480 |
| 5,195,758 A * | 3/1993 | Erway | ..................... | F16J 9/068 |
| | | | | 267/1.5 |
| 7,044,472 B2 * | 5/2006 | Takahashi | ............... | F16J 9/067 |
| | | | | 277/434 |
| 2006/0061043 A1 * | 3/2006 | Takahashi | ............... | F16J 9/067 |
| | | | | 277/434 |
| 2011/0221141 A1 * | 9/2011 | Ayuzawa | ................ | F16J 9/068 |
| | | | | 277/434 |
| 2012/0235359 A1 | 9/2012 | Gao et al. | | |
| 2014/0062030 A1 * | 3/2014 | Hitosugi | ................... | F16J 9/12 |
| | | | | 277/489 |
| 2014/0246834 A1 * | 9/2014 | Ayuzawa | ................ | F16J 9/06 |
| | | | | 277/467 |
| 2014/0265149 A1 * | 9/2014 | Nakazawa | ................ | F16J 9/12 |
| | | | | 277/467 |
| 2015/0167844 A1 * | 6/2015 | Yabune | .................... | F16J 9/065 |
| | | | | 277/477 |
| 2015/0184747 A1 * | 7/2015 | Kunimoto | .................. | F16J 9/06 |
| | | | | 277/473 |

FOREIGN PATENT DOCUMENTS

| | | |
|---|---|---|
| JP | 15-12886 Y1 | 9/1940 |
| JP | 38-011401 Y1 | 6/1963 |
| JP | 59-127856 A | 7/1984 |
| JP | 2000-018386 A | 1/2000 |
| JP | 2000-027995 A | 1/2000 |
| JP | 2001-295926 A | 10/2001 |
| JP | 2002-310299 A | 10/2002 |
| JP | 2003-254155 A | 9/2003 |
| JP | 2006-258110 A | 9/2006 |
| JP | 2011-185383 A | 9/2011 |
| WO | WO 01/77548 A1 | 10/2001 |
| WO | WO 2011/043364 A1 | 4/2011 |

OTHER PUBLICATIONS

Written Opinion of the International Searching Authority issued in PCT/JP2013/064653 dated Aug. 13, 2013.

European Patent Office Communication and extended search report issued in the corresponding European Patent Application No. 13797980.3 on Jan. 21, 2016.

* cited by examiner

COMBINED OIL CONTROL RING

FIELD OF THE INVENTION

The present invention relates to a combined oil control ring mounted to a piston for an internal combustion engine, particularly to a combined oil control ring comprising two upper and lower side rails, and an axially corrugated spacer expander having upper and lower portions.

BACKGROUND OF THE INVENTION

In automobile engines, a lubricating oil is heated and exposed to a blowby gas during a long period of operation, so that the lubricating oil is contaminated with unburned hydrocarbons and degenerated oil additives (called "oil sludge" as a whole). The oil sludge includes oil sludge precursors having relatively high viscosity. The oil sludge attached to and accumulated on engine parts likely wears the parts and clogs lubricating oil paths, causing troubles in the functions of engine parts such as combined oil control rings (called "oil rings" unless otherwise mentioned). In the oil rings, spacer expanders and side rails are stuck to each other in the worst case, hindering the movement of separate side rails, and thus failing to exhibit a sufficient oil-controlling function.

As shown in FIGS. 6(a)-6(c), a conventional combined oil ring 101 comprises a pair of annular side rails 120a, 120b arranged with a gap, and a spacer expander 101 supporting the side rails 120a, 120b. The spacer expander 101 in an axially corrugated form has upper portions 102, lower portions 103, and leg portions 104 connecting the upper portions 102 and the lower portions 103. It has tabs 105a, 105b on the inner side of the upper portions 102 and the lower portions 103, projections 106a, 106b supporting the side rails 120a, 120b on the outer side, and dented intermediate portions 107a, 107b between the tabs 105a, 105b and the projections 106a, 106b. When the spacer expander 101 is combined with the side rails 120a, 120b, each space 108a, 108b is defined by each tab 105a, 105b, each projection 106a, 106b, each intermediate portion 107a, 107b, and each side rail 120a, 120b.

In the oil ring, the side rails 120a, 102b are pressed by radial and axial components of a force due to the inclination angle of the tabs 105a, 105b of the spacer expander 101, thereby exhibiting a function of sealing a cylinder wall and side surfaces of ring grooves of a piston. Particularly, a small-width oil ring having a small axial width h1 has good followability to a cylinder sidewall with a side-sealing function, resulting in reduced friction loss without increasing oil consumption even if it is a low-tension type. However, in the oil ring, oil sludge is easily accumulated in a space 108a, 108b between the spacer expander and the side rails as described above. Particularly in the case of a small-width oil ring with extremely narrow space 108a, 108b, the side rails 120a, 120b are highly likely stuck to the spacer expander 101 by the accumulated oil sludge. The accumulation of oil sludge extremely reduces the followability of side rails 120a, 120b to a cylinder wall, resulting in drastically increased oil consumption.

To prevent the attachment and accumulation of oil sludge to an oil ring, the surface coating of a spacer expander and a side rail, and the structure of a spacer expander avoiding the accumulation of oil sludge are disclosed.

For example, JP 2002-310299 A and JP 2003-254155 A disclose a fluororesin coating and a fluororesin-containing resin coating, JP 2000-027995 A discloses a coating containing fluoroalkyl-substituted alkoxide, JP 2006-258110 A discloses a hydrophilic prepolymer coating containing inorganic polysilazane, WO 2011/043364 A1 discloses a method for forming a metal coating having low surface free energy and hydrogen bonding force. These coatings are water-repellant, oil-repellant, or oppositely hydrophilic coatings, or those formed based on methods of preventing the attachment of oil sludge.

As a structural measure, JUM 59-127856 A discloses an oil ring comprising a spacer expander having upper and lower portions, sufficiently large holes permitting foreign materials such as lead compounds to pass being formed in intermediate portions of the upper and lower portions, such that they do not reach uprising portions of corrugation. U.S. Pat. No. 5,195,758 and JP 2011-185383 A disclose spacer expanders having structures preventing the accumulation of oil sludge, which comprise radial grooves in intermediate portions, and oil-exiting holes communicating with the grooves in tabs.

However, the coating methods of JP 2002-310299 A, JP 2003-254155 A, JP 2000-027995 A, JP 2006-258110 A, and WO 2011/043364 A1 suffer excess steps leading to cost increase, and the hole-forming method of JUM 59-127856 A need difficult working, making the oil rings expensive. Also, oil resides in the grooves formed in intermediate portions in U.S. Pat. No. 5,195,758 and JP 2011-185383 A during the stop of engines, likely suffering the accumulation of oil sludge. As a result, sufficient durability is not obtained in such an operation pattern as undergoing repeated stop of engines.

OBJECT OF THE INVENTION

To solve the above problems, an object of the present invention is provide a combined oil control ring for automobile engines capable of keeping an excellent oil-controlling function without suffering sticking between a spacer expander and side rails for a long period of operation.

SUMMARY OF THE INVENTION

It has been found that the accumulation of oil sludge can be prevented even in a small-width, low-tension, combined oil control ring, by having a basic structure making oil easily flowable from intermediate portions of a spacer expander toward both circumferential sides.

Thus, the combined oil control ring of the present invention comprises two upper and lower side rails, and an axially corrugated spacer expander having upper and lower portions; a leg portion connecting each upper portion and each lower portion of the spacer expander having a portion with an inclination angle θ of 15° or more from the axial direction. The inclination angle θ is preferably in a range of 25° or more.

Each of the upper and lower portions is preferably constituted by a tab pressing an inner peripheral surface of the side rail, a projection supporting the side rail, and an intermediate portion between the tab and the projection; at least the intermediate portion comprising a substantially flat pad portion; and a ratio L/P of the circumferential length L of the flat pad portion to a corrugation pitch P being 40% or less. The ratio L/P is more preferably 30% or less, further preferably 20% or less.

Each of the upper and lower portions is preferably constituted by a tab pressing an inner peripheral surface of the side rail, a projection supporting the side rail, and an intermediate portion between the tab and the projection; at least the intermediate portion being curvedly projecting toward the opposing side rails. The radius of curvature R of the projection is more preferably in a range of 0.3-3 mm, further preferably in a range of 0.5-1.5 mm.

The intermediate portion is preferably inclined such that it becomes more distant from the opposing side rail as it nears the tab.

BRIEF DESCRIPTION OF THE DRAWINGS

FIG. 6(*b*) is a view showing from outside part of a conventional spacer expander.

FIG. 6(*c*) is a cross-sectional view showing a conventional combined oil control ring.

DESCRIPTION OF THE PREFERRED EMBODIMENTS

Figure 1:
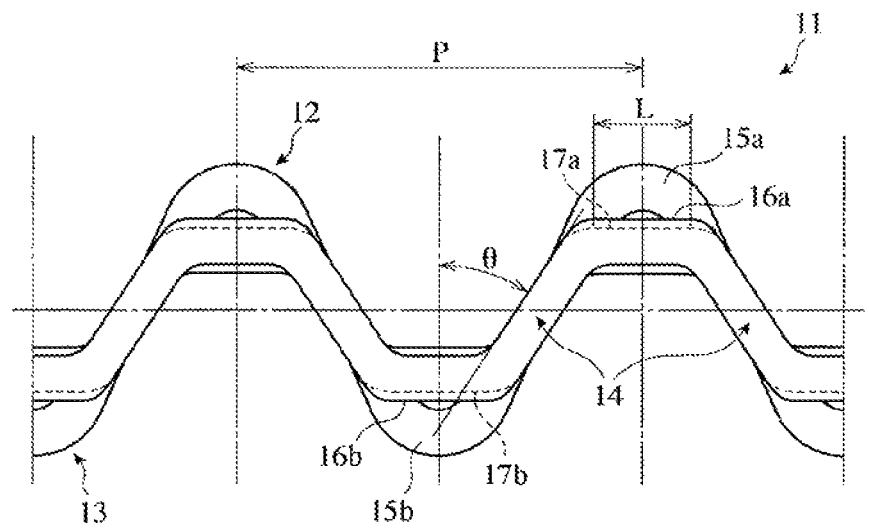
FIG. 1 is a view showing from outside part of an example of spacer expanders constituting the combined oil control ring of the present invention.
Figure 2:
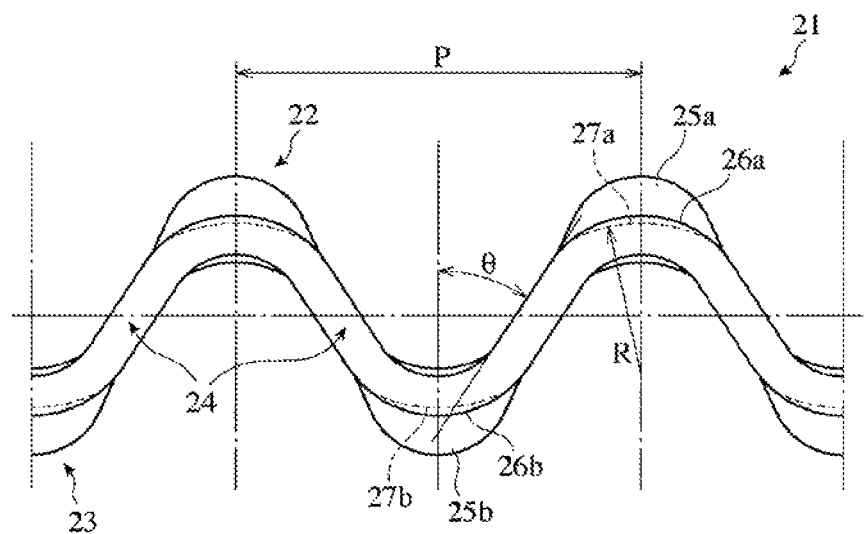
FIG. 2 is a view showing from outside part of another example of spacer expanders constituting the combined oil control ring of the present invention.

Examples of the combined oil control ring of the present invention will be explained in detail referring to the drawings below. The spacer expander 11 shown in FIG. 1 comprises leg portions 14 having an inclination angle θ of 15° or more to the axial direction, which is larger than in conventional spacer expanders. Accordingly, the spacer expander 11 comprises intermediate flat pad portions 17*a*, 17*b* with a relatively short circumferential length L, between upper portions 12 and lower portions 13. Of course, in place of the flat pad portions 17*a*, 17*b*, curved intermediate portions 27*a*, 27*b* projecting toward opposing side rails with a curvature of 1/R may be used as shown in FIG. 2. With such a shape, oil sludge unlikely resides in a space between the spacer expander and the side rail, thereby avoiding the accumulation of oil sludge and the adhesion of the spacer expander to the side rail. The circumferential length L of the flat pad portions 17*a*, 17*b* has a close relation to the inclination angle θ of the leg portions 14 of the spacer expander. A larger inclination angle θ tends to reduce the circumferential length L of the flat pad portions 17*a*, 17*b*. The inclination angle is preferably in a range of 25° or more. A ratio of the circumferential length L of the flat pad portions to the corrugation pitch P of the spacer expander is preferably 40% or less, more preferably 30% or less, further preferably 20% or less. When the intermediate portions 27*a*, 27*b* are in the form of an upward projecting curve, their radius of curvature R is preferably 0.3-3 mm, more preferably 0.5-1.5 mm.

Figure 3:
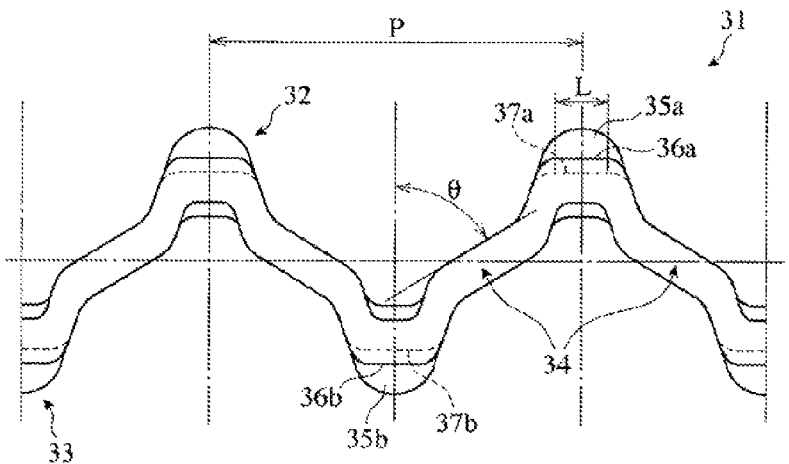
FIG. 3 is a view showing from outside part of a further example of spacer expanders constituting the combined oil control ring of the present invention.
Figure 4:
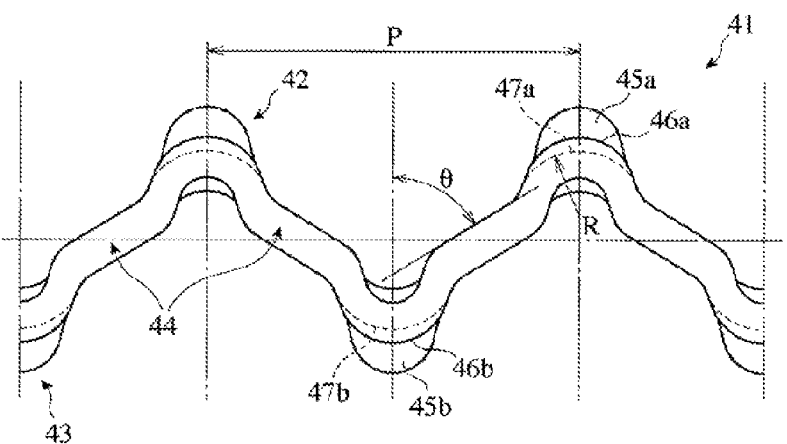
FIG. 4 is a view showing from outside part of a still further example of spacer expanders constituting the combined oil control ring of the present invention.

From the aspect of the dischargeability (less residence) of oil sludge, a larger effectively is obtained by flat pad portions with smaller circumferential length L, projections with a smaller radius of curvature R, or leg portions with a smaller inclination angle θ. However, in the embodiment shown in FIGS. 1 and 2, shorter flat pad portions need leg portions with a larger inclination angle θ, making it impossible to expect the improvement of the dischargeability of oil sludge by reducing the inclination angle θ of the leg portions. In the embodiment shown in FIGS. 3 and 4, the leg portions have a small inclination angle θ only in portions near the upper portions and the lower portions, and a large inclination angle θ in middle portions between the upper and lower portions of the leg portions. With such a shape, the dischargeability of oil sludge is remarkably improved by reducing the circumferential length L of the flat pad portions 37*a*, 37*b* (FIG. 3) or the radius of curvature R of the projections (FIG. 4), or by drastically increasing the inclination angle of the leg portions from the flat pad portions.

Figure 5:
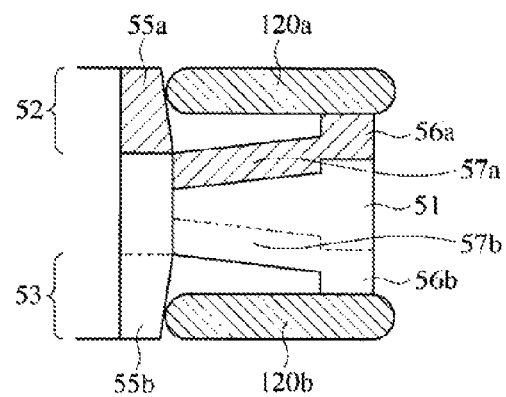
FIG. 5 is a cross-sectional view showing a still further example of the combined oil control rings of the present invention, wherein the view is sectioned axially through a tab.
Figure 6A:
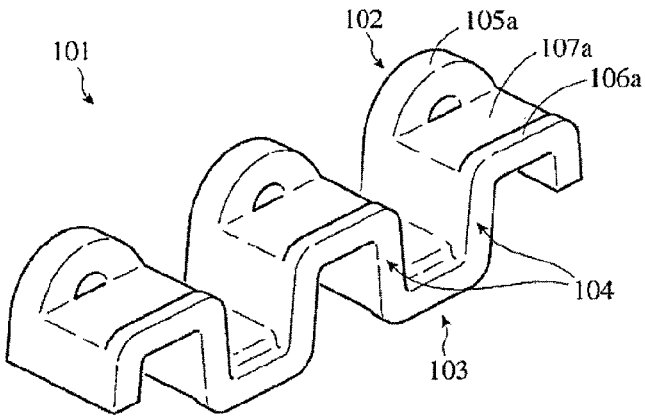
FIG. 6(*a*) is a perspective view showing part of a conventional spacer expander.
Figure 6B:
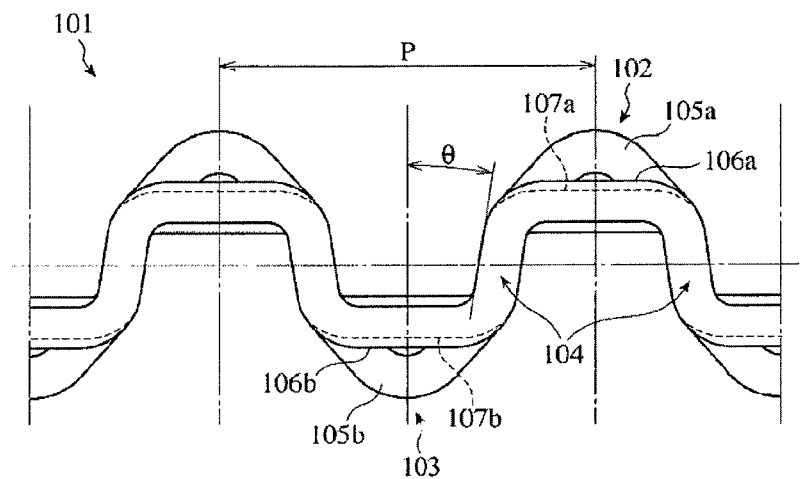
Figure 6C:
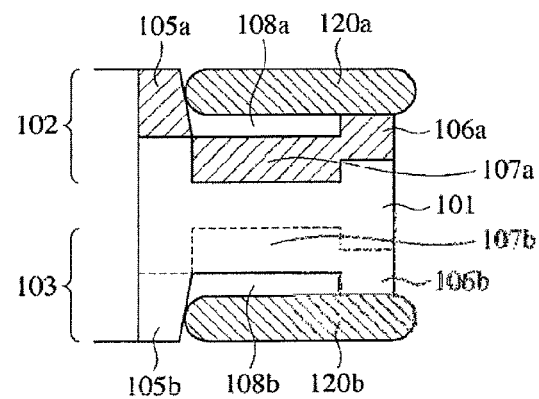

In the combined oil control ring shown in FIG. 5, the spacer expander is inclined, such that the intermediate portions become more distant from the opposing side rails as they near the tabs. Of course, the spacer expander may be inclined oppositely, such that the intermediate portions become more distant from the side rails as they near the projections. With this inclination, the residence of oil sludge is further prevented.

Examples 1-5 and Comparative Example 1

An spacer expander of SUS304 having a nominal diameter d1 of 71 mm, a combined nominal width h1 of 1.5 mm, and a combined thickness a1 of 1.9 mm, and a side rail of SUS440 having a width of 0.4 mm were formed for a combined oil ring. The spacer expander having a pitch of 2.7 mm between adjacent upper portions (lower portions), as well as the inclination angle θ of leg portions and the circumferential length L of flat pad portions shown in Table 1, was produced by axially corrugating a SUS304 ribbon by local bending with gears, shearing it to form tabs, rolling it to provide tabs with a predetermined tab angle of 20°, and finally coiling it to form a truly circular spacer expander.

TABLE 1

| No. | Inclination Angle θ (°) | Circumferential Length L of Flat Pad Portions (mm) | L/P* (%) |
| --- | --- | --- | --- |
| Example 1 | 35 | 0.7 | 26 |
| Example 2 | 20 | 1.2 | 44 |
| Example 3 | 25 | 1.0 | 37 |
| Example 4 | 40 | 0.6 | 22 |
| Example 5 | 45 | 0.3 | 11 |
| Comparative Example 1 | 10 | 1.6 | 59 |

Note:
*P: 2.7 mm.

[1] Actual Engine Test

Combined oil control rings of each of Examples 1-3 were attached to first to third cylinders of a 1-liter, 3-cylinder engine. The operation of this engine under the conditions of a predetermined pattern was repeated as an actual engine test. After 250 hours, a side rail gap and the amount of oil sludge attached were measured by the following evaluation methods. Further, an actual engine test was conducted on cylinders having combined oil control rings of each of Examples 4-5 and Comparative Example 1 under the same operation conditions as in Examples 1-3. Each test was conducted three times in each Example and Comparative Example. Top rings and second rings used had the following specifications.

(1) Top Ring
Material: SWOSC-V,
Peripheral surface: Ion-plated with chromium nitride, and
Size: d1=71 mm, h1=1.0 mm, and a1=2.3 mm.
(2) Second Ring
Material: SWOSC-V,
Entire surface: Coated with zinc phosphate, and
Size: d1=71 mm, h1=1.0 mm, and a1=2.3 mm.

[2] Evaluation Method

The following evaluation was conducted after the actual engine test.

(1) Measurement of Side Rail Gap

After the actual engine test, the piston was withdrawn from the cylinder, and a gap $S_2$ of each of upper and lower side rails in each combined oil control ring was measured, to determine a ratio $S_2/S_1$, wherein $S_1$ represents the gap of each side rail mounted to the piston before the actual engine test. $S_2/S_1$ was determined on each of the upper and lower side rails in three actual engine tests, and averaged.

(2) Measurement of the Amount of Attached Oil Sludge

After the actual engine test, each combined oil control ring was removed from the piston, and cleaned with acetone. Thereafter, it was dried at 120° C. for 1 hour in an electric furnace, cooled to room temperature in a desiccator, and then measured with respect to its mass to determine its difference from the mass of the combined oil control ring measured in advance before the actual engine test. Differences determined in three actual engine tests were averaged to obtain the amount of oil sludge attached.

The actual engine test results in Examples 1-5 and Comparative Example 1 are shown in Table 2. The side rail gap and the amount of attached oil sludge are shown by relative values, with $S_2/S_1$ in Comparative Example 1 as 100, and the amount of attached carbon sludge in Comparative Example 1 as 100.

TABLE 2

| No. | $S_2/S_1$ | Amount of Attached Carbon Sludge |
| --- | --- | --- |
| Example 1 | 170 | 34 |
| Example 2 | 148 | 80 |
| Example 3 | 162 | 40 |
| Example 4 | 168 | 35 |
| Example 5 | 165 | 32 |
| Comparative Example 1 | 100 | 100 |

Table 2 indicates that Examples 1-5 had as large gaps as about 1.5-1.7 times and the amounts of attached oil sludge reduced to 32-80% after the actual engine test, as compared with those of Comparative Example 1. It is considered that in Comparative Example 1 in which the leg portions of a spacer expander had an inclination angle of 10°, the accumulation of oil sludge constrained the side rails, so that the gaps were not returned to the original one (did not expand) even after the pistons were withdrawn from the cylinders, while in Examples 1-5, the attachment and accumulation of oil sludge were reduced, resulting in reduced constraint of the oil rings, and thus expanding the gaps more closely to those before the operation than in Comparative Example 1. It was observed in Example 3 that when the leg portions of the spacer expander had an inclination angle of 25° or more, an extremely smaller amount of oil sludge was attached.

Example 6

Combined oil control rings were produced in the same manner as in Example 1, except that intermediate portions of each spacer expander had curved shapes having a radius of curvature of 1 mm and projecting toward opposing side rails in place of the flat pad portions, and mounted to each cylinder of a 3-cylinder engine to carry out the same actual engine test as in Example 1. The measurement results of all cylinders were averaged. As compared with Comparative Example 1, the gap was 1.6 times, and the amount of attached oil sludge was 32%.

Example 7

Combined oil control rings were produced in the same manner as in Example 1, except that each spacer expander was formed to have leg portions with an inclination angle of 18° only in portions near the upper and lower portions and 50° in middle portions between the upper and lower portions, with intermediate flat pad portions having a circumferential length of 0.5 mm, and mounted to each cylinder of a 3-cylinder engine to carry out the same actual engine test as in Example 1. The measurement results of all cylinders were averaged. As compared with Comparative Example 1, the gap was 1.7 times, and the amount of attached oil sludge was 35%.

Examples 8-10

Combined oil control rings were produced in the same manner as in Example 1, except that each spacer expander was formed to have not only leg portions with an inclination angle of 18° only in portions near the upper and lower portions and 50° in middle portions between the upper and lower portions, but also curved shapes having the radius of curvature shown in Table 3 and projecting toward opposing side rails in place of the intermediate flat pad portions, and mounted to each cylinder of a 3-cylinder engine to carry out the same actual engine test as in Example 1. The measurement results of the actual engine test conducted 3 times were averaged, and are shown in Table 3.

TABLE 3

| No. | Inclination Angle θ* (°) | Radius of Curvature R of Intermediate Portions (mm) | $S_2/S_1$ | Amount of Attached Oil Sludge |
| --- | --- | --- | --- | --- |
| Example 8 | 50 | 0.5 | 165 | 36 |
| Example 9 | 50 | 1.5 | 168 | 34 |
| Example 10 | 50 | 2.0 | 155 | 41 |

Note:
*Inclination angle of the leg portions in middle portions between the upper and lower portions.

Examples 8-10 were excellent in both of the side rail gap and the amount of attached oil sludge. This reveals that extremely high dischargeability of oil sludge is achieved by the leg portions having as large an inclination angle θ as 50° in middle portions between the upper and lower portions, and as small an inclination angle as 18° only in portions near the upper and lower portions, as well as a drastically increased inclination angle from the intermediate portions, the intermediate projections having a small radius of curvature R.

Example 11

Combined oil control rings were produced in the same manner as in Example 2 (inclination angle θ: 20°, circumferential length L of flat pad portions: 1.2 mm, and L/P:

44%), except that each spacer expander was formed to have intermediate portions inclined by 3° such that they became more distant from opposing side rails as they neared the tabs, and mounted to each cylinder of a 3-cylinder engine to carry out the same actual engine test as in Example 2. The measurement results of all cylinders were averaged. As compared with Comparative Example 1, the gap was 1.61 times, and the amount of attached oil sludge was 33%, which were much improved than in Example 2.

Effects of the Invention

In the combined oil control ring of the present invention comprising an axially corrugated spacer expander having upper and lower portions connected via leg portions which have an inclination angle θ of 15° or more from the axial direction, namely having upper and lower portions having short circumferential length, oil sludge is less accumulated in a space between the intermediate portions of the spacer expander and side rails, thereby preventing the side rails from sticking to the spacer expander. When the intermediate portions are curvedly projecting toward opposing side rails, oil sludge easily flows in both circumferential directions of the intermediate portions. Also, when the intermediate portions are inclined such that they become more distant from the side rails as they near the tabs, oil sludge easily flows inward. In both cases, a higher effect of preventing the accumulation of oil sludge is obtained, making it possible to prevent the accumulation of oil sludge even in a small-width, low-tension, combined oil control ring. Further, the spacer expander constituting the combined oil control ring of the present invention can be formed by usual gears without needing additional steps such as coating and drilling. Because of such structure, of course, oil does not reside in a space between the spacer expander and the side rails while the engine is not operated, resulting in sufficient durability even in an operation pattern having repeated stops of the engine.

What is claimed is:

1. A combined oil control ring comprising:
   an annular upper side rail and an annular lower side rail; and
   an axially corrugated one piece annular spacer expander located between the upper side rail and the lower side and having a plurality of upper and lower portions, the upper and lower portions alternating in a circumferential direction of the combined oil control ring, wherein:
   a plurality of leg portions, the leg portions connecting each upper portion of said spacer expander to each adjacent lower portion of said spacer expander, each leg portion has a substantially straight main portion having an inclination angle θ of 25-50° from an axial direction, which is a direction along a main axis around which the combined oil control ring is formed,
   each of said upper and lower portions has a tab pressing an inner peripheral surface of one of said side rails, a projection supporting said one of said side rails, and an intermediate portion directly radially between said tab and said projection and of lower axial height than the tab and projection,
   a ratio (L/P) of an overall circumferential length (L) of each of said intermediate portions to a corrugation pitch (P), which is the circumferential distance between adjacent most upper portions or adjacent most lower portions, is 40% or less, and
   oil sludge accumulation is substantially reduced due to the inclination angle and ratio (L/P) during operation on a piston of an internal combustion engine.

2. The combined oil control ring according to claim 1, wherein each of said intermediate portions consists of only one substantially flat pad portion.

3. The combined oil control ring according to claim 1, wherein each of said intermediate portions is curvedly projecting toward either said upper side rail or said lower said rails.

4. The combined oil control ring according to claim 3, wherein each of said intermediate portions has a radius of curvature R of 0.3-3 mm.

5. The combined oil control ring according to claim 2, wherein each of said flat pad portions is inclined with respect to a plane perpendicular to the axial direction.

6. The combined oil control ring according to claim 1, wherein the inclination angle (θ) is 35° to 50°.

7. The combined oil control ring according to claim 1, wherein the inclination angle (θ) is 40° to 50°.

8. The combined oil control ring according to claim 1, wherein the inclination angle (θ) is 45° to 50°.

* * * * *